UNITED STATES PATENT OFFICE.

JOHN W. MEADER, OF INDIANAPOLIS, INDIANA, ASSIGNOR TO THE ELI LILLY AND COMPANY, OF INDIANAPOLIS, INDIANA, A CORPORATION OF INDIANA.

CEPHAELIN ETHYL ETHER.

1,219,572.　　　　Specification of Letters Patent.　　Patented Mar. 20, 1917.

No Drawing.　　Application filed July 17, 1915.　Serial No. 40,484.

*To all whom it may concern:*

Be it known that I, JOHN W. MEADER, a citizen of the United States, residing at Indianapolis, Marion county, and State of Indiana, have invented and discovered certain new and useful Improvements in Cephaelin Ethyl Ether, of which the following is a specification.

The invention relates to the previously unknown cephaelin ethyl ether, to which may be given the formula $C_{28}H_{37}O_3N_2OC_2H_5$, in which the hydrogen of the hydroxyl group of cephaelin has been replaced by an ethyl group.

This compound is a valuable medicinal product, especially in the form of a salt. Its uses are similar to those of emetin and somewhat larger doses thereof than emetin may be administered owing to its less toxic effect.

The compound may be prepared by treating cephaelin with an alkali metal and an ethyl haloid and isolating the cephaelin ethyl ether by suitable methods. The process in detail may be carried out as follows:

46.6 grams of cephaelin and 4.6 grams of sodium are dissolved in about 400 cubic centimeters of absolute alcohol, about 15 grams of ethyl bromid added, and the solution boiled under a reflux condenser for at least two hours. Cephaelin ethyl ether which now exists in solution is isolated by recovering the alcohol, dissolving in dilute hydrochloric acid, making ammoniacal and extracting with ether. The ether solution of cephaelin ethyl ether and unchanged cephaelin is extracted with an excess of dilute caustic soda solution to remove the cephaelin and evaporated to dryness on a water bath. The compound may be further purified by dissolving in an acid, crystallizing as a salt, dissolving in water, making ammoniacal, extracting with ether, recovering the ether and drying in vacuum.

In the above process, potassium may be substituted for sodium and ethyl iodid for ethyl bromid. The absolute alcohol may be replaced by any other suitable solvent, for instance amyl alcohol.

Cephaelin ethyl ether is a varnish line substance easily soluble in alcohol, ether, and chloroform. It dissolves in acids to form salts. The hydrobromid crystallizes in concentric groups of white needles. The hydrochlorid and nitrate are also crystalline.

What I claim is:

1. The ethyl ether of cephaelin.
2. An ethyl compound of cephaelin containing essentially the atomic aggroupment $C_{28}H_{37}O_3N_2OC_2H_5$.
3. The process of producing an ethyl ether of cephaelin comprising adding to cephaelin an alkali metal, an ethyl haloid and a solvent.
4. The process of producing cephaelin ethyl ether by treating cephaelin with sodium ethylate and ethyl bromid.
5. The process of producing an ethyl ether of cephaelin which comprises treating cephaelin with an alkali metal alcoholate and an ethyl haloid.

In witness whereof, I have hereunto set my hand and seal at Indianapolis, Indiana, this 15th day of July, A. D. nineteen hundred and fifteen.

JOHN W. MEADER. [L. S.]

Witnesses:
　E. W. BRADFORD,
　A. C. RICE.